United States Patent [19]

Futagawa

[11] Patent Number: 4,558,831

[45] Date of Patent: Dec. 17, 1985

[54] APPARATUS FOR DRIVING TAPES

[76] Inventor: Tosinobu Futagawa, 5-21-2-503, Higashigotanda, Shinagawa-ku, Tokyo, Japan

[21] Appl. No.: 517,823

[22] Filed: Jul. 27, 1983

[30] Foreign Application Priority Data

Aug. 5, 1982 [JP] Japan ................................ 57-136538
Oct. 28, 1982 [JP] Japan ................................ 57-189786
Dec. 20, 1982 [JP] Japan ................................ 57-223273

[51] Int. Cl.$^4$ ........................ G11B 3/30; G11B 23/12
[52] U.S. Cl. ................................... 242/55; 242/181; 360/91
[58] Field of Search .............. 242/55, 64, 80, 56.9, 242/180, 181; 360/91, 92

[56] References Cited

U.S. PATENT DOCUMENTS

| | | | |
|---|---|---|---|
| 2,498,336 | 2/1950 | Kennedy | 242/75.5 |
| 2,539,521 | 1/1951 | Owens | 242/181 |
| 3,127,178 | 3/1964 | Osborne et al. | 242/181 X |
| 3,518,645 | 6/1970 | Leinberger et al. | 360/91 |

OTHER PUBLICATIONS

IBM Technical Disclosure Bulletin, *Random Access Multi-Reel Tape Drive*, Nejezchleb, vol. 6, No. 9, 2/1964.

*Primary Examiner*—Stuart S. Levy
*Assistant Examiner*—Lloyd D. Doigan
*Attorney, Agent, or Firm*—Wolf, Greenfield & Sacks

[57] ABSTRACT

A tape driving apparatus is disclosed which is operable to select a desired tape among a plurality of tapes and to move the selected tape so as to position one or more items recorded on the tape in a predetermined position or to record information on the tape. The tape driving apparatus includes at least one first roller, a plurality of second rollers, a plurality of tapes, each of which is wound from its one end on the corresponding second roller and all of which are wound together from their other ends on the first roller, first means for positioning at least one of the second rollers in a predetermined position, and second means for rotating said second roller or second rollers and the first roller associated therewith to bring a desired portion of the tape in said predetermined position. The first and second rollers and the tapes are assembled together as a roller-tape assembly. The roller-tape assembly can be constituted by a removable roller-tape cassettes.

8 Claims, 20 Drawing Figures

Fig. 14
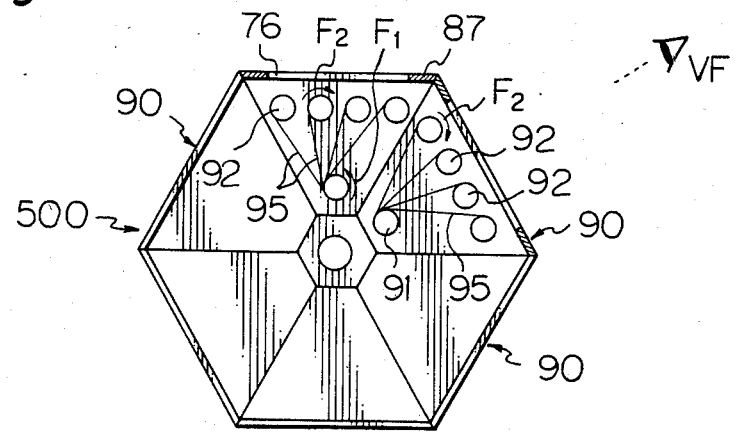
Fig. 15
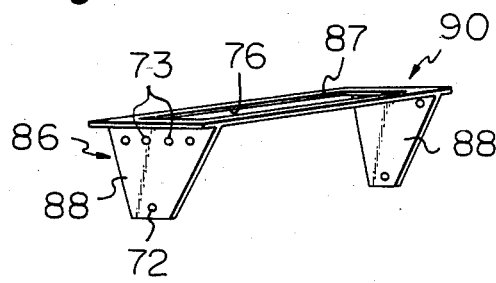
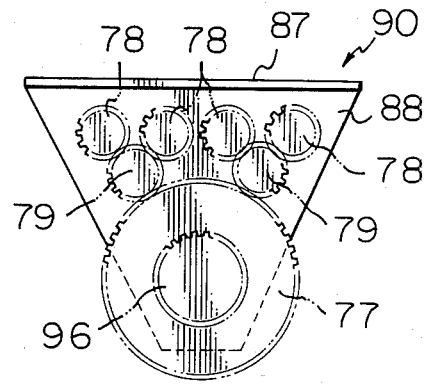
Fig. 16

APPARATUS FOR DRIVING TAPES

BACKGROUND OF THE INVENTION

The present invention relates to an apparatus for driving tapes, films, sheets, webs and the like (referred to generically as "tapes" hereinafter), and more particularly it relates to an apparatus for selecting a desired tape among a plurality of tapes and for moving the selected tape so as to position one or more items recorded on said tape in a predetermined station or to record information on said tape.

The present invention is applicable to multi-purpose codeless input equipments for computer addressers, telephone itself and telephone exchangers, microfilm readers, magnetic recording systems or the like.

A conventional codeless input machine 4 (FIG. 1) comprises an input unit 1 and a film 2 on which a number of items 3 are recorded in matrix pattern. Each item recorded on the film corresponds to a respective information to be inputted. All of the items recorded on the film are grouped into a plurality of pages 5 having a lengthwise dimension B equal to that of the input unit, a transverse dimension of each page corresponding to the width of the film. In order to position a desired item 3 on the input unit 1 for inputting the information corresponding to the desired item, the film 2 can be moved by means of an appropriate film feeding device (not shown) incorporated into the input machine in both directions indicated by an arrow A such that the page 5 including the desired item 3 is aligned with the input unit 1. When the desired item 3 is energized by a pen-touch or key-push operation, a corresponding input signal is generated; said input signal selecting or designating a corresponding address among a plurality of addresses stored in a memory (not shown) through the medium of a control portion (not shown) in the input unit 1, thereby generating an output signal regarding the information corresponding to the desired item. When a new item to be inputted next is not included in the present page, the film must be moved to position a new page including said new item on the input unit 1.

In this conventional input machine, since the movement of the film is effected per "page", when the lengthwise dimension of the page B and the moving speed of the film is V, it takes at least a time of B/V for changing a page from one to the next one. Particularly, if the first page is changed to the last page, when the total number of pages is N, it takes a long time of B/V (N−1). Accordingly, this conventional input machine has a disadvantage of time consumption for changing pages with the result that efficiency of inputting operation is reduced.

By increasing the moving speed of the film, the above drawback of the conventional input machine can be more or less eliminated. However, in this case, there exists another drawback that it is difficult to accurately stop a desired page of the film in a predetermined position on the input unit.

Another codeless input machine having a plurality of films wound on a single roller is also already known, as described in the Japanese Patent Public Disclosure No. 29734/81. In this known codeless input machine (FIGS. 2A and 2B), inner ends of the films 6 are secured to a single roller 7 at predetermined circumferential intervals, the films being wound on the roller in the same sense. When the films are unwound by rotating the roller 7 in a direction C by means of a stepping motor (not shown) with the aid of guide rollers 8 and an endless belt 9, a desired film 6 is separated from the other films by means of a film separating bar 10, thereby guiding only the selected film in a predetermined position (between an input unit 11 and a guide 12). However, in this known input machine, since the free ends of the films wound on the roller 7 are in an uncontrolled condition, erroneous selection of the film and jam of the films frequently occur.

SUMMARY OF THE INVENTION

An object of the present invention is to provide a tape driving apparatus capable of quickly and accurately selecting a desired tape among a plurality of tapes and positioning any portion of the selected tape in a predetermined station.

In a preferred embodiment of the present invention, the tape driving apparatus comprises a central roller (first roller), a plurality of rollers (second rollers) arranged around the first roller along a circle coaxial with the first roller at predetermined circumferential intervals, a plurality of tapes, each of which is wound, from its one end, on the corresponding second roller, the tapes being wound together, from the other ends thereof, on the first roller, means for rotating the first roller, and means for rotating all of the second rollers together. Preferably, each second roller is associated with a corresponding guide plate on which the respective tape is guided during the movement of the tape from the first roller to the second roller or vice versa.

Another object of the present invention is to provide a tape driving apparatus comprising a plurality of removable roller cassettes, each cassette including one first roller and a plurality of second rollers associated with the first roller, the tapes being wound, from their one ends, on the corresponding second rollers and also wound together, from the other ends, on the first roller. The cassettes can be assembled together to constitute the whole roller-tape assembly.

BRIEF DESCRIPTION OF THE DRAWINGS

FIGS. 2A and 2B show schematic sectional views of an another conventional codeless input machine, wherein FIG. 2A shows a condition before the film selection and FIG. 2B shows a condition after the film selection;

FIGS. 13 to 16 show a roller-tape assembly constituted by a plurality of roller-tape cassettes, wherein FIG. 13 is a perspective view of a frame of the apparatus, FIG. 14 is a cross-sectional view taken along the line XIV—XIV of FIG. 17 showing the roller-tape assembly, FIG. 15 is a perspective view of a cassette frame, and FIG. 16 is an end view of the cassette;

DETAILED DESCRIPTION OF THE PREFERRED EMBODIMENTS

Figure 1:
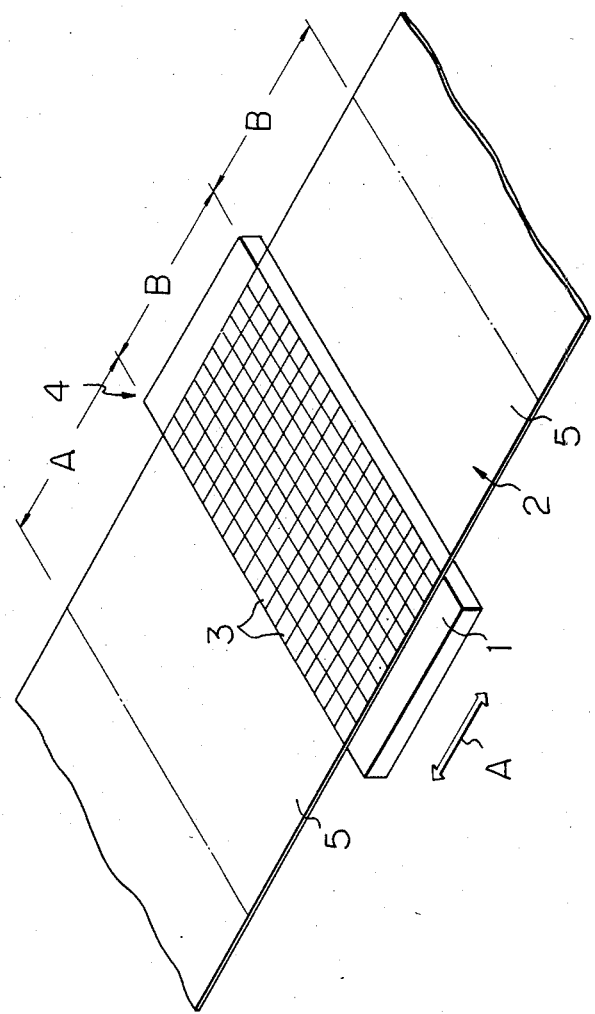
FIG. 1 is a partial perspective view of a conventional codeless input machine.
Figure 2A:
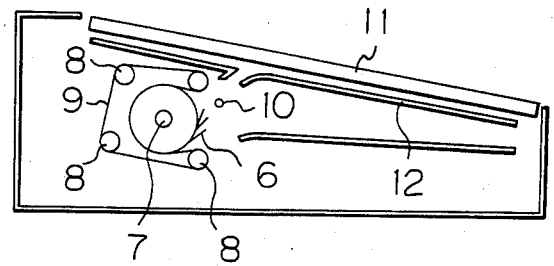
Figure 2B:
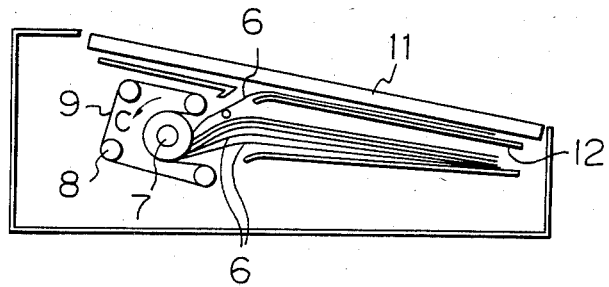

The present invention will now be described in detail with reference to the drawings showing embodiments of the tape driving apparatus according to the invention. As shown in FIGS. 3–5 and 7, a tape driving apparatus according to the present invention comprises a roller-tape assembly 100. The assembly 100 comprises disk-shaped end plates 37, 39 (FIGS. 5, 7), a central roller (first roller) 21 coaxial with and rotatably supported by the end plates 37, 39, and a plurality of rollers (second rollers) 20 rotatably mounted on the end plates by end shaft 24, 38, the second rollers 20 extending parallel to the first roller 21 and arranged around the first roller along a circle 52 coaxial with the first roller at predetermined intervals. Guide plates 23 of a transparent material are arranged near the corresponding second rollers 20 at radially outer positions thereof. Each guide plate 23 extends between the end plates 37 and 39 and is secured to the end plates. On each second roller 20, a corresponding tape 22 is wound from its one end. The tapes 22 extend from the corresponding second rollers 20 to pass on the corresponding guide plates 23 and are wound together on the first roller 21 from the other ends thereof. Accordingly, when the first roller 21 is rotated in an anticlockwise direction (FIG. 3), all of the tapes 22 are simultaneously wound on the first roller by the same amount, while when all of the second rollers 20 are simultaneously rotated in a clockwise direction (FIG. 3), all of the tapes 22 are simultaneously unwound from the first roller by the same amount.

The tape driving apparatus according to the embodiment of FIGS. 3 to 8 has a mechanism 110 for selectively rotating the first and second rollers 20, 21. The mechanism 110 (FIG. 5) comprises a gear train 111 (FIGS. 5, 6) which includes gears 25 secured to the corresponding shafts 24 of the second rollers 20, a gear 28 secured to an end shaft 27 of the first roller 21, an inner ring gear 30 engaged by an idle gear 29 which is rotatably mounted on the end plate 37 by a shaft 36 and which is in turn engaged by the gear 28 of the first roller, and an outer ring gear 26 engaged by all of the gears 25 of the second rollers 20. The end shaft 27 of the first roller has an outer extension 31, while the inner ring gear 30 has a cylindrical extension 32 which can freely rotate on the shaft extension 31. The outer ring gear 26 has also a cylindrical extension 33 which can freely rotate on the inner cylindrical extension 32. The gear 28, the inner ring gear 30 and the outer ring gear 26 are coaxial with each other. A two-way clutch 34 having cluth elements 34A and 34B is associated with the cylindrical extensions 32, 33 of the ring gears 30, 26. More particularly, the cylindrical extension 32 of the inner ring gear is connected, through the clutch element 34A, to a driving belt 35 driven by a reversible stepping motor (not shown), while the cylindrical extension 33 of the outer ring gear is connected to the belt 35 through the clutch element 34B.

Figure 3:
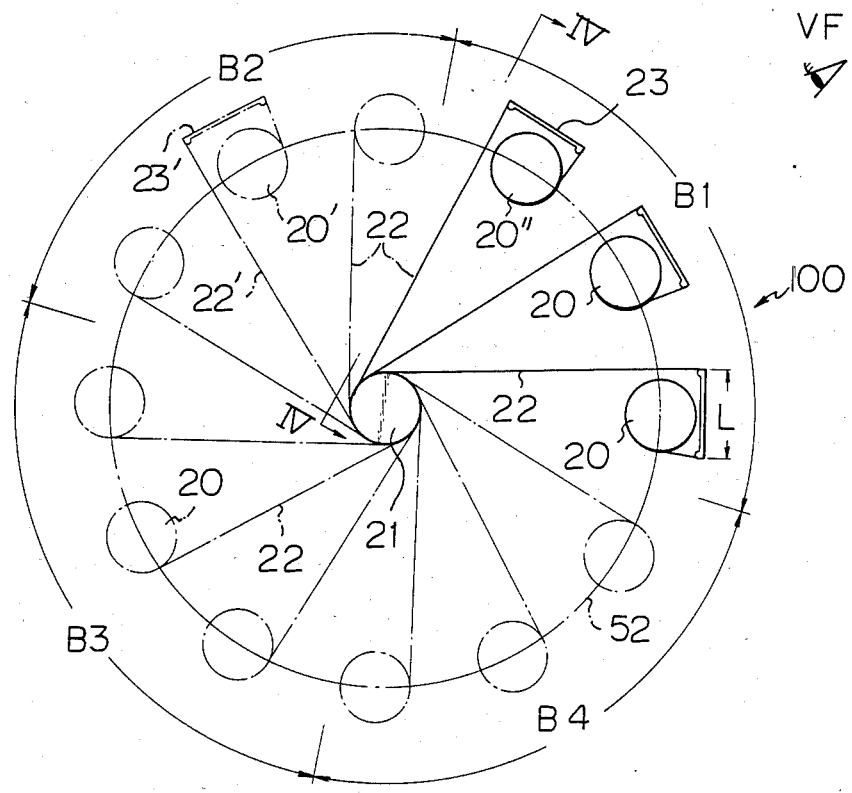
FIG. 3 is a schematic side view showing a portion of a roller-tape assembly of the tape driving apparatus according to an embodiment of the present invention.
Figure 4:
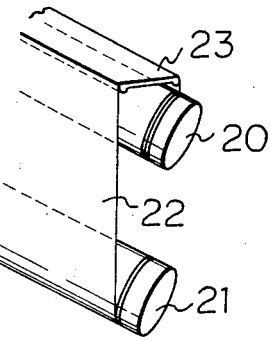
FIG. 4 is a partial perspective view taken along the line IV—IV of FIG. 3.
Figure 5:
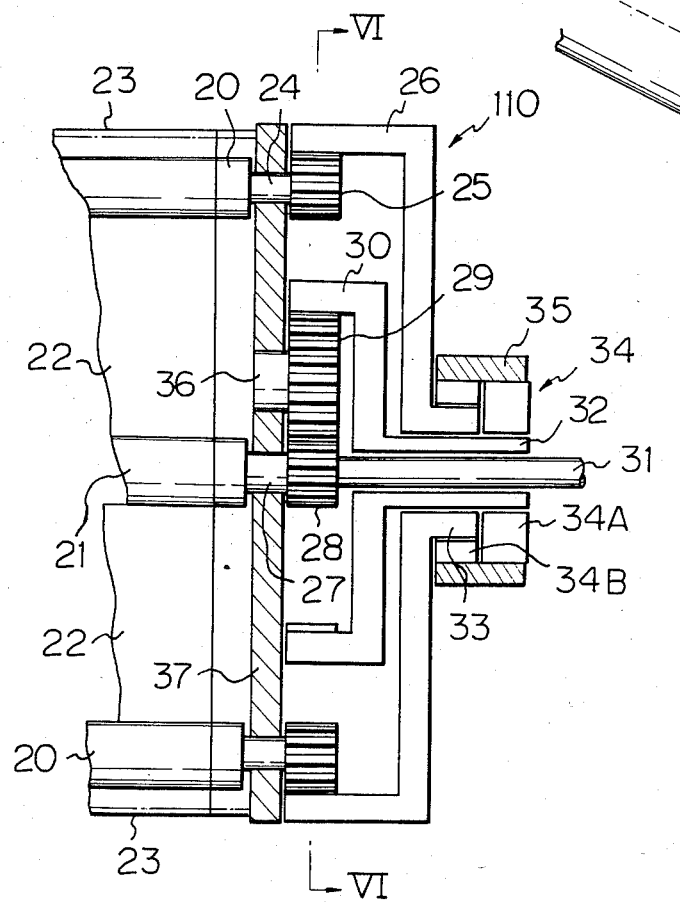
FIG. 5 is a longitudinal sectional view showing a mechanism for rotating the rollers of FIG. 3.
Figure 6:
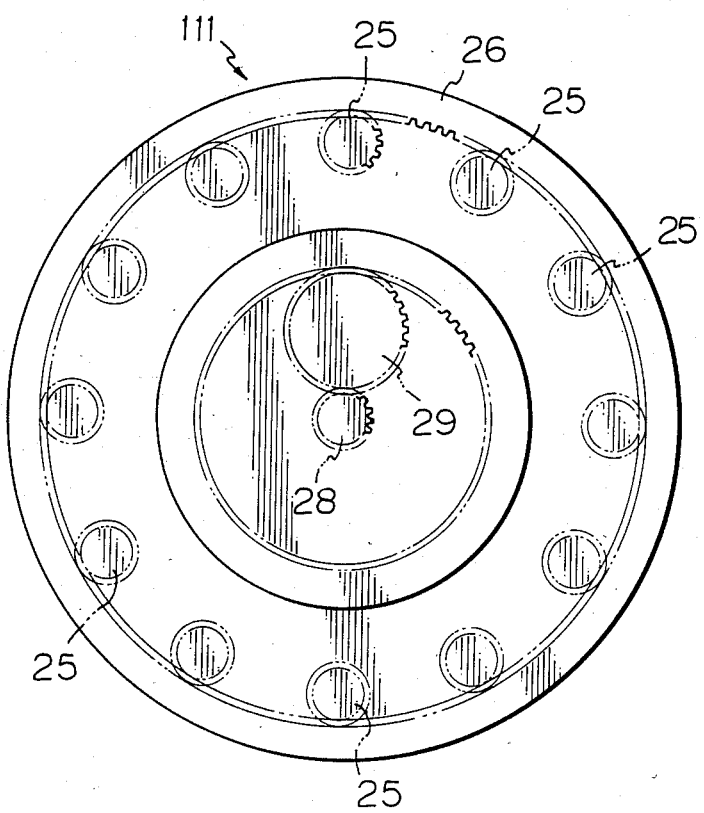
FIG. 6 is a cross-sectional view taken along the line VI—VI of FIG. 5, showing a gear train of the mechanism of FIG. 5.

In order to positively rotate the first roller 21 in an anticlockwise direction (FIG. 3) to wind the tapes 22 on this roller, the clutch element 34A is energized so that the inner ring gear 30 is coupled to the stepping motor through the extension 32, the clutch element 34A and the belt 35. Then, the stepping motor is activated to rotate the ring gear 30 in a clockwise direction (FIG. 6), thereby rotating the first roller 21 in an anticlockwise direction through the idle gear 29 and the gear 28 of the first roller so that all of the tapes 22 are simultaneously wound on the first roller by the same amount. During this operation, the tapes 22 can be freely unwound from the corresponding second rollers 20, since the outer ring 26 is not coupled to the driving belt 35 (due to the fact that the clutch element 34B is not energized) and the outer ring 26 and the gears 25 of the second rollers can freely rotate. Similarly, in order to positively rotate the second rollers simultaneously to unwind the tapes 22 from the first roller 21, the clutch element 34B is energized so that the outer gear 26 is coupled to the stepping motor through the extension 33, the clutch element 34B and the belt 35. Then the stepping motor is activated to rotate the ring gear 26 in a clockwise direction (FIG. 6), thereby rotating simultaneously all of the second rollers 20 in the clockwise direction through the gears 25 of the second rollers so that all of the tapes 22 are simultaneously unwound from the first roller by the same amount. During this operation, the first roller 21 can be freely rotated, since the inner ring gear 30 associated with the first roller is not coupled to the driving belt 35. Preferably, the first roller 21 or the second rollers 20 are rotated step-by-step to shift the tapes by a distance equal to a width L of the guide plate 23 (FIG. 3). In this way, when the tape driving apparatus according to the invention is applied to the codeless input machine, if the width L of the guide plate is designed to be the same as a width of each column of the items (to be inputted) constituting "one page" and the number of the second rollers 20 is the same as the number of the columns included in "one page", one page can be changed by shifting the tapes only by the distance L.

The tape driving apparatus according to the above-mentioned embodiment (FIGS. 3 to 8) is further provided with a mechanism 50 for turning the roller-tape assembly 100. The mechanism 50 (FIGS. 7 and 8) is arranged at the left end of the roller-tape assembly 100 and comprises a first outer crown gear 42 having a cylindrical extension 41 keyed or spline-coupled to a central bore 40 of the end plate 39 of the roller-tape assembly 100, a first inner crown gear 45 having a cylindrical extension 44 secured to the extension 41 and slidably mounted on a left end shaft 43 of the first roller 21, a second outer crown gear 47 secured to a fixed frame 46 of the tape driving apparatus and engageable with the first outer crown gear 42, a second inner crown gear 48 rotatable with respect to the second outer crown gear 47 and keyed to the end shaft 43 of the first roller and engageable with the first inner crown gear 45, a first coil spring 51 positioned between the end plate 39 and the first crown gear 42 for normally engaging this crown gear 42 with the corresponding outer crown gear 47, a second coil spring 53 positioned between the inner crown gears 45 and 48 for normally disengaging the crown gear 48 from the crown gear 45, and an electromagnetic device 49 which, when received a block signal (explained hereinafter), shifts the second inner crown gear 48 to the right (FIG. 7) against the action of the spring 53 to engage the gear 48 with the corresponding gear 45 and also shifts the first outer crown gear 42 to the right against the action of the spring 51 to release the crown gear 42 from the corresponding outer crown gear 47.

The mechanism 50 is used for turning the roller-tape assembly 100 to bring a desired second roller 20 or a desired group (block) of the second rollers 20 into a visual field VF of an operator. In this connection, the second rollers 20 can be divided into a plurality of groups or blocks. In the roller-tape assembly 100 including twelve second rollers 20 shown in FIG. 3, the second rollers are divided into four blocks B1-B4, each block including three second rollers. In FIG. 3, the block B1 is positioned into the visual field of the operator.

Now, assuming that the block B2 is desired to be brought into the visual field VF of the operator so that the operator can easily handle the tape (for example, the tape 22') in the block B2 (FIG. 3), the roller-tape assembly 100 must be rotated by 90° in the clockwise direction. To this end, a block signal generated by a suitable control circuit (not shown) is sent to the electromagnetic device 49, which shifts the second inner crown gear 48 to the right (FIG. 7) into engagement with the corresponding inner crown gear 45. A further movement of the second inner crown gear 48 to the right by means of the electromagnetic device 49 causes the disengagement of the outer crown gear 42 from the corresponding outer crown gear 47, thereby obtaining the operative position of the mechanism 50 (FIG. 8). Now, the inner ring gear 30 (FIG. 5) is coupled to the driving belt 35 by activating the clutch element 34A of the two-way clutch 34, and then the ring gear 30 is turned by the reversible stepping motor through the belt 35 and the clutch element 34A in such a way that the first roller 21 is rotated by 90° in a clockwise direction (FIG. 3). Due to the key-connections between the second inner crown gear 48 (FIGS. 7, 8) and the shaft 43 of the first roller 21 and between the first outer crown gear 42 and the end plate 39 of the roller-tape assembly 100 and due to the fact that the mechanism 50 is in the operative position of FIG. 8, the 90° rotation of the first roller 21 (in the clockwise) causes a 90° rotation of the end plate 39 and accordingly of the roller-tape assembly 100 (in the clockwise), thereby positioning the block B2 into the visual field VF of the operator. In this case, since there is no relative movement between the first roller 21 and the end plates 39, 37 (and, accordingly, the second rollers 20 supported by the end plates), the tapes are neither wound nor unwound with respect to the first and second rollers. Accordingly, if a desired portion of the tape 22' in the block B2 has already been positioned on the corresponding guide plate 23', the movement of the tape 22' by rotating the rollers 20, 21 is not needed. On the contrary, when the block B2 is brought into the visual field VF, if a desired portion of the tape 22' has not yet been positioned on the corresponding guide plate 23', the tape 22' must be moved by means of the mechanism 110 of FIG. 5 until the desired portion of the tape 22' is positioned on the guide plate 23'. This positioning operation can be effected either before or after the block B2 is brought into the visual field VF. In the former case, the first roller 21 or the second rollers 20 are rotated by selectively activating the clutch element 34A or 34B and by energizing the stepping motor, as explained hereinbefore, until the desired portion of the tape 22' is positioned on the guide plate 23', and then the block B2 is turned into the visual field VF, as explained hereinbefore. In the latter cate, after the block B2 is brought into the visual field, the mechanism 50 (FIGS. 7, 8) is returned to the inoperative condition (FIG. 7) by deenergizing the electromagnetic device 49, and then the rollers 21 or 20 are rotated by means of the mechanism 110 of FIG. 5, as described above, until the desired portion of the tape 22' is positioned on the guide plate 23'.

Similarly, if the block B3 or the block B4 is desired to be positioned in front of the visual field VF, the roller-tape assembly 100 may be rotated by 180° or 270°. By using a reversible stepping motor, a reverse 90° rotation (anti-clockwise) of the assembly 100 permits the positioning of the block B4 into the visual field VF.

Figure 7:
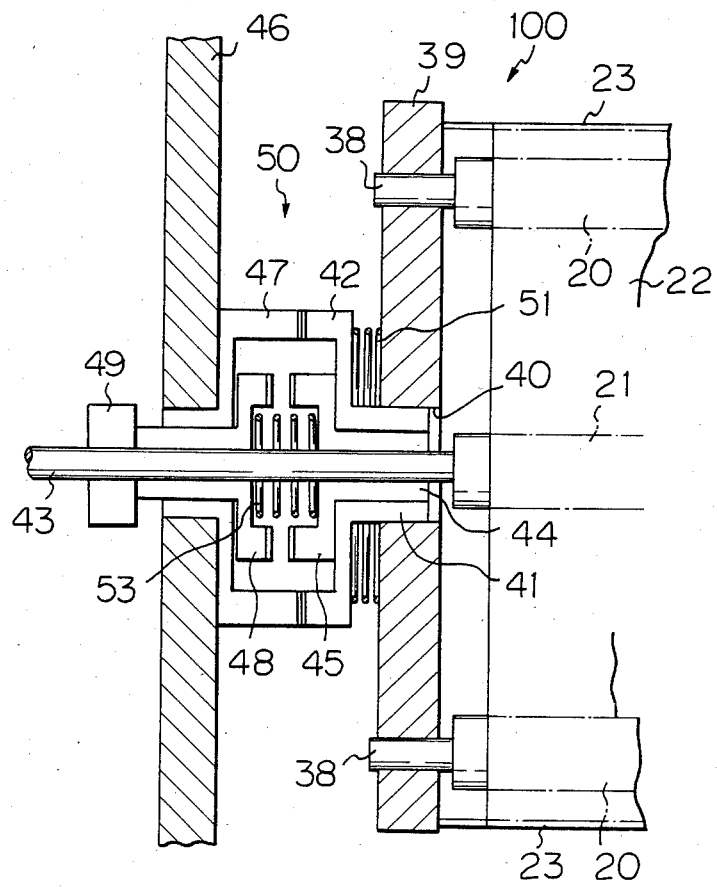
FIG. 7 is a longitudinal sectional view showing a mechanism for turning the roller-tape assembly, in an inoperative position.
Figure 8:
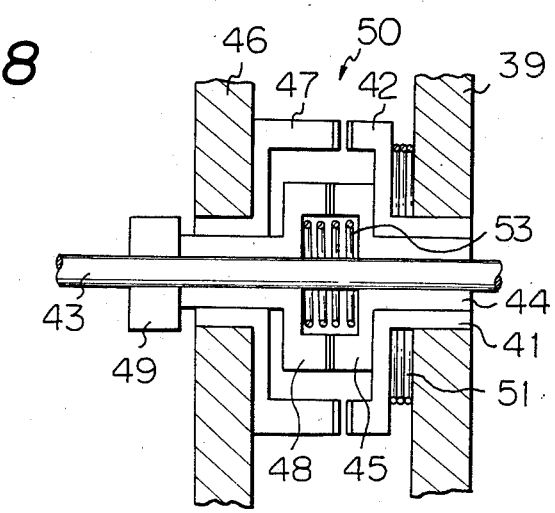
FIG. 8 is a longitudinal sectional view of the mechanism of FIG. 7, in an operative position.

When the mechanism 50 for turning the assembly 100 is in the inoperative position as shown in FIG. 7, the roller-tape assembly 100 is maintained stationary by the engagement between the first outer crown gear 42 angularly fixed to the end plate 39 of the assembly 100 and the second outer crown gear 47 secured to the fixed frame 46 of the tape driving apparatus, thus permitting the positive rotation of the rollers 20 or 21 by means of the mechanism 110.

It should be understood that, in place of the positioning of the "block B1-B4" in the visual field, each second roller can be brought in front of the visual field. For example, in FIG. 3 (including twelve second rollers), the second rollers 20' and 20' can be brought in front of the VF by rotating the assembly 100 by 30° and 90°, respectively.

Figure 9:
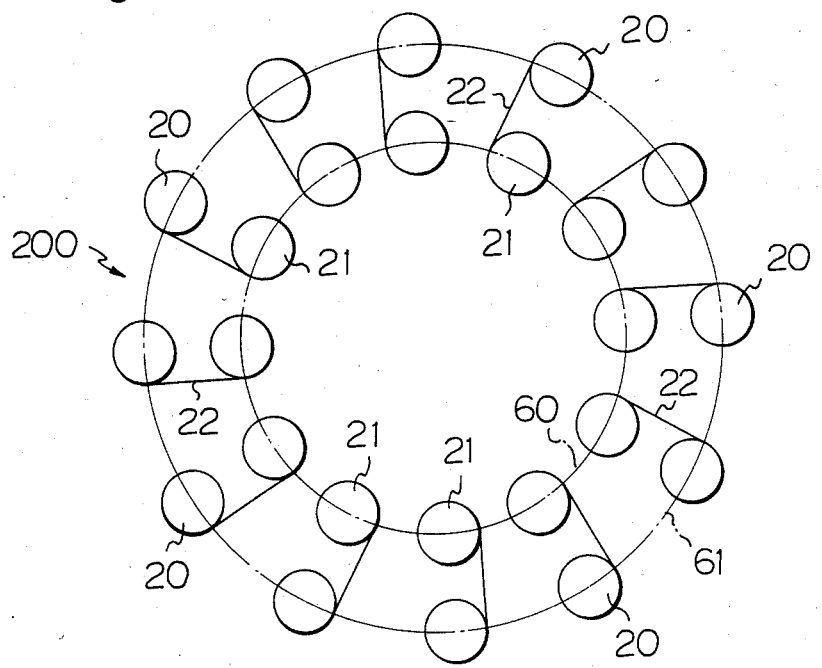
FIGS. 9, 10 and 11 are schematic side views showing second, third and fourth embodiments of the roller-tape assembly, respectively.
Figure 12A:
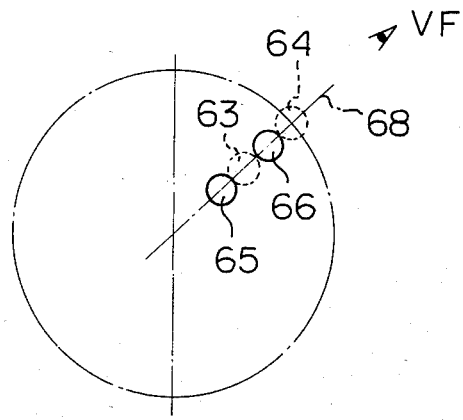
FIGS. 12A and 12B show, respectively, a positional relationship and partial sectional view of a mechanism for driving the rollers of FIGS. 9–11; another tape driving apparatus comprising.
Figure 12B:
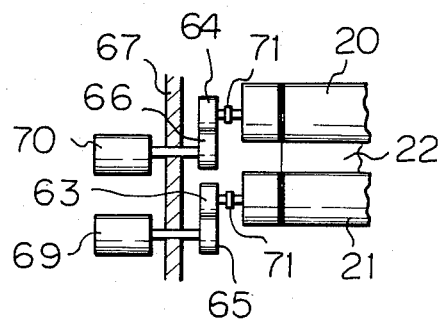
Figure 13:
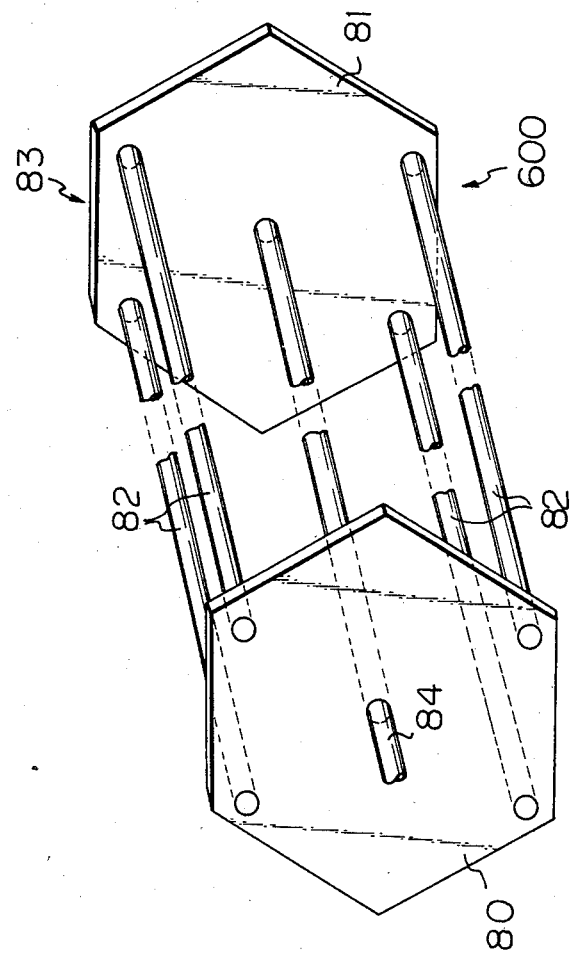
Figure 17:
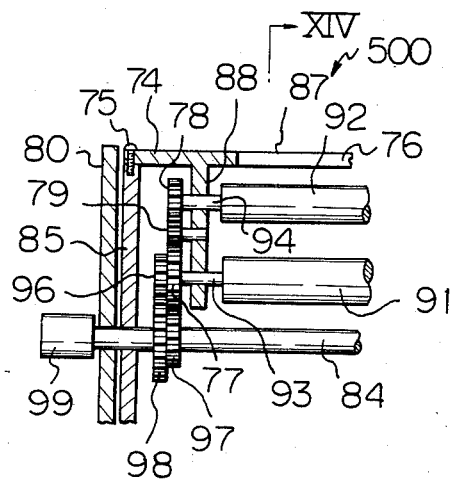
FIG. 17 is a partial cross-sectional view of a mechanism for driving the rollers of the roller-tape assembly of FIGS. 13–16.

FIG. 9 shows an arrangement of rollers of a roller-tape assembly 200 according to a second embodiment of the invention. The assembly 200 comprises plural pairs of first and second rollers 21 and 20, and tapes 22 each of which is wound from its one end on the corresponding first roller 21 and is wound from its other end on the corresponding second roller 20. The first rollers 21 extend parallel to each other and are arranged along a smaller circle 60 at predetermined intervals. Similarly, the second rollers 20 extend parallel to each other and also to the first rollers and are arranged along a larger circle 61 coaxial with the smaller circle at predetermined intervals. In the second embodiment of FIG. 9, in order to rotate the first gears 21 or the second gears 20 selectively, a mechanism (not shown) similar to the roller driving mechanism 110 can be used. However, in this case, a spur wheel engaged by all of pinions (similar to the gear 28) of the first rollers 21 are used in place of the inner ring gear 30. The mechanism 50 for turning the roller-tape assembly (FIGS. 7, 8) can be used for turning the roller-tape assembly 200 of FIG. 9. Of course, a desired tape 22 on the corresponding rollers 20, 21 can be brought into the visual field VF of the operator by rotating the assembly 200 directly by means of a suitable stepping motor (not shown). Lastly, instead of the simultaneous rotation of all of the first rollers 21 or the second rollers 20 by means of the roller driving mechanism such as the mechanism 110 of FIG. 5, each pair of the rollers 20, 21 can be driven independently of the other pairs of rollers. For example, as shown in FIGS. 12A and 12B, each pair of the first roller 21 and the second roller 20 have friction rollers 63, 64 at one end thereof. Further, a pair of friction rollers 65, 66 are rotatably mounted on a fixed part 67 of the tape driving apparatus, these friction rollers 65, 66 being arranged along a line 68 directed to the visual field VF of the operator. When the pair of rollers 20, 21 are brought in front of the visual field VF, the friction rollers 63, 64 engage with the corresponding friction rollers 65, 66. By rotating the friction roller 63 or 64 by means of corresponding stepping motor 69 or 70, the corresponding first roller 21 or the second roller 20 can be positively driven. In this case, the roller which is not positively driven can be freely rotated by deenergizing clutch means 71.

Figure 10:
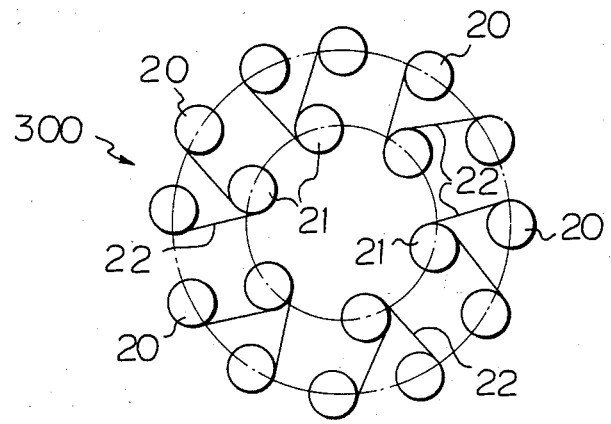
Figure 11:
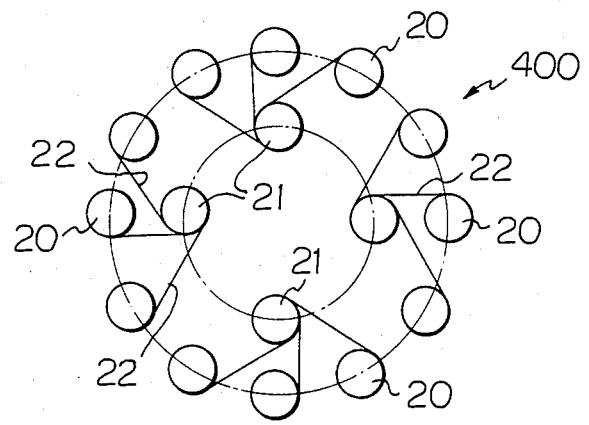

FIG. 10 shows an arrangement of rollers of a roller-tape assembly 300 according to a third embodiment of the invention, and FIG. 11 shows an arrangement of rollers of a roller-tape assembly 400 according to a fourth embodiment of the invention. The roller arrangements of these embodiments of FIGS. 10 and 11 are similar to that of FIG. 9; however, in FIG. 10, each first roller 21 is associated with two second rollers 20 and two tapes 22, while in FIG. 11, each first roller 21 is associated with three second rollers 20 and three tapes 22.

Although the roller-tape assembly 200, 300, 400 are provided with end plates (similar to the end plates 37, 39 of FIG. 5) and guide plates (similar to the guide plate 23), these elements are omitted from FIGS. 9 to 12 for clarifying the same.

FIGS. 13 to 18 show another embodiment of the tape driving apparatus 600 according to the present invention. The tape-driving apparatus 600 comprises two hexagonal end walls 80, 81 interconnected by a plurality of rigid bars 82, these elements 80-82 constituting a frame 83 of the apparatus. The apparatus 600 includes a roller-tape assembly 500 which comprises two hexagonal end plates (one of which is shown by 85 in FIG. 17) fixed to a central shaft 84 rotatably supported by the end walls 80, 81 and six roller-tape cassettes 90 removably mounted on the end plates 85. Each roller-tape cassette 90 (FIGS. 14-16) comprises a cassette frame 86 having a top wall 87 and trapezoidal side walls 88, a first roller 91 rotatably mounted on the side walls 88 by an end shaft 93, a plurality of second rollers 92 each of which is also rotatably mounted on the side walls 88 by a respective end shaft 94, and tapes 95 wound from their one end on the corresponding second rollers and wound together from the other ends on the first roller 91. More particularly, the cassette frame 86 (FIG. 15) has a hole 72 formed in the side walls 88 for receiving the end shaft 93 of the first roller 91, a plurality of holes 73 formed in the side walls 88 and aligned with each other in a plane parallel to the top wall 87 for receiving the corresponding end shafts 94 of the second rollers 92, projections 74 (FIG. 17) extending laterally and outwardly from the ends of the top wall 87, by which the cassette 90 is removably mounted on the end plates 85 by means of an appropriate fixing means such as a screw 75, and a rectangular opening 76 (FIG. 15) formed in the top wall 87 to facilitate the operator's access to the tapes.

Figure 18:
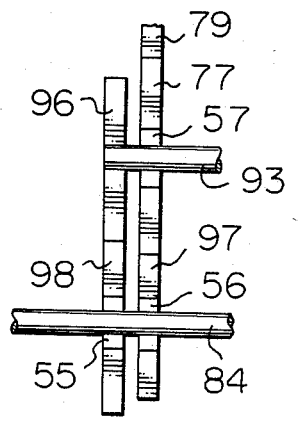
FIG. 18 is a partial view showing a gear train of the mechanism of FIG. 17.

On one end of the first roller 91, for example, on the left end shaft 93 of the first roller 91, a gear 77 is fixed. Similarly, a gear 78 is fixed on the left end shaft 94 of each second roller 92. The gear 77 meshes with two idle gears 79 rotatably mounted on the side wall 88, the idle gears 79 being engaged with the gears 78 of the second rollers 92 (FIG. 16). Accordingly, when the gear 77 is rotated, all of the gears 78 of the second rollers are simultaneously rotated in the same direction. Further, on the shaft 93 of the first roller 91, a gear 96 is fixed coaxially with the gear 77. When the roller-tape cassette 90 is mounted on the end plate 85 by means of the screw 75, the gears 77 and 96 of the first roller 91 mesh with corresponding gears 97 and 98 secured to the central shaft 84 which can be rotated either in the clockwise direction or in the anticlockwise direction by means of a reversible stepping motor 99. Clutches 55, 56 and 57 are arranged between the gear 98 and the shaft 84, between the gear 97 and the shaft 84, and between the gear 57 and the end shaft 93, respectively (FIG. 18).

When all of the roller-tape cassettes 90 are mounted on the end plates 85, the roller-tape assembly 500 is obtained (FIG. 14), which has a hexagonal drum shape.

In order to bring a desired cassette 90 in front of the visual field VF (FIG. 14) of the operator, the roller-tape assembly 500 can be rotated by a suitable stepping motor (not shown) or by the mechanism 50 of FIG. 7. Further, in order to rotate the first roller 91 or all of the second rollers 92 for positioning a desired portion of the tape 95 in front of the visual field VF, the following operations are effected. If the tapes 95 should be wound on the first roller 91, after the clutch 55 of the gear 98 (FIG. 17) is energized and the clutches 56, 57 of the gears 97, 77 are deenergized, the central shaft 84 is rotated by the reversible stepping motor 99 in the clockwise direction (FIG. 17) so as to rotate the first roller 91 (through the gears 98, 96) in a direction indicated by an arrow F1 in FIG. 14, thereby winding all of the tapes 95 on the first roller until the desired portion of the tape is positioned in front of the visual field VF. During this operation, since the clutches 56, 57 are not energized, the second rollers can be freely rotated to pay out the tapes therefrom. On the contrary, if the tapes 95 should be wound on the second rollers 92, after the clutch 56 is energized and the clutches 55, 57 are deenergized, the central shaft 84 is rotated by the reversible motor 99 in the anticlockwise direction (FIG. 17) so as to rotate all of the second rollers 92 (through the gears 97, 77, 79 and 78) in a direction indicated by an arrow F2 in FIG. 14, thereby unwinding all of the tapes from the first roller 91 until the desired portion of the tapes is positioned in front of the visual field VF. Also, during this operation, since the clutches 55, 57 are not energized, the first roller 91 can be freely rotated to pay out the tapes therefrom. In the embodiment of FIGS. 13-18, the guide plates for the tapes are omitted from these Figures for clarifying the same.

Although the hexagonal roller-tape assembly 500 constituted by six cassettes 90 is illustrated and explained hereinbefore, it should be noted that the number of the cassettes constituting the roller-tape assembly is not limited to six. For example, eight cassettes can be used for constituting an octagonal roller-tape assembly. Of course, the number of the second rollers is not limited to four. Similarly, in the roller-tape assembly 100 of FIG. 3, the number of the second rollers 20 should not be limited to twelve as illustrated.

The tape driving apparatus of the present invention can be applied to various uses. For example, when magnetic tapes are used and one or more magnetic heads are provided adjacent to the guide plate, the tape driving apparatus can be utilized as magnetic reading system such as tape-recorders. Further, when the tapes are microfilms and film reading head is connected to a computer or a projector, the tape driving apparatus can be used as input or output equipment of the computer or a display. Of course, when a plurality of items are recorded on the tapes and a conventional input unit including a control portion and address memory is used, the tape driving apparatus can be utilized as multi-purpose codeless input equipment for computer addressers and telephone exchangers. It should be noted that the tape driving apparatus of the present invention can be utilized for other applications such as integrated information systems, data retrieval systems, data processing systems or the like.

This application is, therefore, intended to cover any variations, uses, or adaptations of the invention following the general principles thereof and including such departures from the present disclosure as come within known or customary practice in the art to which this inveniton pertains and fall within the limits of the appended claims.

What is claimed is:

1. A tape-driving apparatus for positioning a desired portion of a tape in a predetermined station, said apparatus comprising a first roller, a plurality of second rollers arranged parallel to the first roller, a plurality of tapes, each of which is wound from its one end on an associated second roller and all of which are wound together from their other ends on the first roller, first means for positioning at least one of the second rollers in a predetermined station, and second means for rotating said second roller or second rollers and the first roller to bring a desired portion of the tape in said predetermined station.

2. A tape-driving apparatus according to claim 1, wherein said second rollers are arranged around the first roller along a circle coaxial with said first roller at predetermined circumferential intervals, said first roller, second rollers and tapes being assembled together as a roller-tape assembly, said first means rotating said roller-tape assembly to position the desired second roller in said predetermined station.

3. A tape-driving apparatus for positioning a desired portion of a tape in a predetermined station, said apparatus comprising a plurality of first rollers extending parallel to one another, each of said first rollers having a plurality of corresponding second rollers arranged parallel to said first roller, a plurality of tapes, each of which is wound from its one end on an associated second roller and all of which are wound together from their other ends on the corresponding first roller, first means for positioning at least one of the second rollers in a predetermined station, and second means for rotating said second roller or second rollers and the first roller corresponding therewith to bring a desired portion of the tape in said predetermined station.

4. A tape-driving apparatus according to claim 1, wherein said first rollers are arranged substantially along an inner circle at predetermined circumferential intervals and said second rollers are arranged substantially along an outer circle concentric with said inner circle at predetermined circumferential intervals, said first rollers, second rollers and tapes being assembled together as a roller-tape assembly, and said first means rotating said roller-tape assembly to position the desired second roller in said predetermined station.

5. A tape-driving apparatus according to claim 4, wherein each of the first rollers, corresponding second rollers and associated tapes are assembled as a removable roller-tape cassette.

6. A tape-driving apparatus according to claim 5, wherein said first means comprises a hexagonal drum and said roller-tape assembly comprises six removable cassettes disposed around said hexagonal drum.

7. A tape-driving apparatus for positioning a desired portion of a tape in a predetermined station, said apparatus comprising a plurality of first rollers extending parallel to one another and arranged substantially along an inner circle at predetermined circumferential intervals, a plurality of second rollers extending parallel to said first rollers and arranged substantially along an outer circle concentric with said inner circle at predetermined circumferential intervals, each of said second rollers corresponding with one of said first rollers, a plurality of tapes, each of which is wound from its one end on an associated second roller and from its other end on the corresponding first roller, first means for positioning at least one of the second rollers in a predetermined station, and second means for simultaneously rotating all of said first and second rollers to bring a desired portion of the tape in a predetermined station.

8. A tape-driving apparatus according to claim 7, wherein said first rollers, second rollers and tapes are assembled together as a roller-tape assembly, said first means rotating said roller-tape assembly to position the desired second roller in said predetermined station.

* * * * *

UNITED STATES PATENT AND TRADEMARK OFFICE
CERTIFICATE OF CORRECTION

PATENT NO. : 4,558,831
DATED : December 17, 1985
INVENTOR(S) : Tosinobu Futagawa It is certified that error appears in the above-identified patent and that said Letters Patent is hereby corrected as shown below:

Claim 4, line 1 - "1" should be --3--

Signed and Sealed this

Eighth Day of April 1986

[SEAL]

Attest:

DONALD J. QUIGG

*Attesting Officer*    *Commissioner of Patents and Trademarks*